(12) United States Patent
Xu et al.

(10) Patent No.: US 10,869,424 B2
(45) Date of Patent: Dec. 22, 2020

(54) POWER TOOL, LAWN MOWER, AND CONTROL METHOD THEREOF

(71) Applicant: Nanjing Chervon Industry Co., Ltd., Nanjing (CN)

(72) Inventors: Haishen Xu, Nanjing (CN); Zhao Hu, Nanjing (CN); Yangzi Liu, Nanjing (CN); Toshinari Yamaoka, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 168 days.

(21) Appl. No.: 16/142,131

(22) Filed: Sep. 26, 2018

(65) Prior Publication Data

US 2019/0021223 A1    Jan. 24, 2019

Related U.S. Application Data

(63) Continuation of application No. PCT/CN2017/082683, filed on May 2, 2017.

(30) Foreign Application Priority Data

May 16, 2016   (CN) .......................... 2016 10 323985
May 16, 2016   (CN) .......................... 2016 10 324416

(51) Int. Cl.
*A01D 34/00*   (2006.01)
*A01D 34/69*   (2006.01)
*A01D 101/00*  (2006.01)

(52) U.S. Cl.
CPC ........... *A01D 34/006* (2013.01); *A01D 34/69* (2013.01); *A01D 2101/00* (2013.01)

(58) Field of Classification Search
CPC ...... A01D 34/006; A01D 34/69; A01D 34/73; A01D 34/003; A01D 34/005; A01D 34/78; A01D 34/66; A01D 34/68; A01D 34/733

See application file for complete search history.

(56) References Cited

U.S. PATENT DOCUMENTS 4,041,679 A    8/1977   Seifert
5,353,581 A *  10/1994  Rouse .................... A01D 34/73
                                                          56/255
5,442,901 A    8/1995   Niemela et al.
(Continued)

FOREIGN PATENT DOCUMENTS

CN    101559727 A    10/2009
CN    201733611 U     2/2011
(Continued)

OTHER PUBLICATIONS

ISA/CN, International Search Report issued on PCT application No. PCT/CN2017/082683, dated Aug. 4, 2017, 3 pages.

*Primary Examiner* — Abigail A Risic
(74) *Attorney, Agent, or Firm* — Greenberg Traurig, LLP

(57) ABSTRACT

A lawn mower includes a blade configured to cut grass, a chassis, configured to accommodate the blade, and front and rear wheels connected to the chassis. A motor is configured to drive at least the rear wheel to rotate. A detection apparatus detects the rotational speed of the front wheel and a controller controls the motor. Accordingly, the speed of a front wheel is detected to control a moving speed of the lawn mower, thereby enhancing the performance of the lawn mower and improving the user's experience.

9 Claims, 7 Drawing Sheets

(56) References Cited

U.S. PATENT DOCUMENTS

| | | | | |
|---|---|---|---|---|
| 6,591,593 B1* | 7/2003 | Brandon | ............... | A01D 34/006 |
| | | | | 56/10.6 |
| 8,708,074 B1* | 4/2014 | McCoy | .................. | B60K 17/34 |
| | | | | 180/65.51 |
| 2006/0278446 A1* | 12/2006 | Oxley | ...................... | B62D 3/12 |
| | | | | 180/6.24 |
| 2009/0228166 A1* | 9/2009 | Durkos | ................ | G05D 1/0272 |
| | | | | 701/26 |
| 2010/0191408 A1* | 7/2010 | Boylston | ................ | A01D 75/28 |
| | | | | 701/31.4 |
| 2012/0159916 A1* | 6/2012 | Ishii | ........................ | B60L 8/003 |
| | | | | 56/10.2 A |
| 2012/0322615 A1* | 12/2012 | Matsuzaki | .......... | B60W 10/184 |
| | | | | 477/79 |
| 2014/0188338 A1* | 7/2014 | Ito | ......................... | B62D 51/02 |
| | | | | 701/41 |
| 2016/0106031 A1* | 4/2016 | Bejcek | .................. | A01D 34/69 |
| | | | | 701/70 |
| 2017/0265395 A1* | 9/2017 | Kuriyagawa | ...... | A01D 34/6806 |

FOREIGN PATENT DOCUMENTS

| | | |
|---|---|---|
| CN | 201752182 U | 3/2011 |
| CN | 201752183 U | 3/2011 |
| CN | 202496213 U | 10/2012 |
| CN | 102890509 A | 1/2013 |

\* cited by examiner

POWER TOOL, LAWN MOWER, AND CONTROL METHOD THEREOF

RELATED APPLICATION INFORMATION

This application claims priorities to Chinese patent application No. CN 201610323985.0, filed on May 16, 2016, and Chinese patent application No. CN201610324416.8, filed on May 16, 2016, and Chinese patent application No. CN 201610766724.6, filed on Aug. 30, 2016, the disclosure of which are incorporated herein by reference in its entirety.

BACKGROUND

Technical Field

The present invention relates to the field of power tools, and more specifically, to a self-propelled lawn mower.

Related Art

Existing electric tools, such as lawn mowers and snow sweeper, are equipped with an operation level or joysticks for the user to push. Take a lawn mower as an example, the lawn mower moves on the ground and performs the cutting by the force applied to the operation level or joysticks. When a lawn mower is used to cut grass in a certain area, it is often necessary for the user to push the operation level, so that the lawn mower can work or move back and forth in a straight line to complete the cutting of the lawn in the area. Therefore, the user needs to control the turning of the mower many times in the process of driving the mower to realize the mowing operation.

During the turning of the hand-pushed lawn mower, it relies on the user's push on the lever to achieve, the user needs to consume a lot of energy, and the efficiency of the cutting or lawn mower is greatly affected.

The mower with a self-driving function drives the front wheel or the rear wheel of the mower by a motor. Although it saves the user's physical strength to a certain extent, it is needed to adjust the mower's self-walking speed by the speed switch during the mower's operation. The distance of the speed switch far away from the handle brings inconvenience to the user's operation. Moreover, in order to facilitate the turning of the mower, the user presses the operation lever to lift the front wheel and drive the rear wheel to move and turn. This way often makes the user or operator be forced to walk quickly under the traction of the mower, which is easy to cause security risks and is not good for the user's experience.

SUMMARY

To achieve the foregoing objective, the following technical solutions are used in the present invention:

A self-propelled lawn mower includes a blade, configured to cut grass; a chassis, configured to accommodate the blade; a front wheel connected to a front side of the chassis; a rear wheel connected to a rear side of the chassis; a motor at least configured to drive the rear wheel to rotate; a detection apparatus configured to detect a rotational speed of the front wheel; and a controller configured to enable the motor to decelerate when the rotational speed of the front wheel decreases, where the motor is connected to the rear wheel, and the detection apparatus is electrically connected to the controller.

Furthermore, the lawn mower further includes a fixed assembly configured to rotate along with the front wheel, where the detection apparatus includes: a sensor configured to generate a signal when the fixed assembly passes across a predetermined position; and the sensor is fixedly connected to the chassis.

Furthermore, the sensor is disposed at a position near the front wheel.

Furthermore, the lawn mower has two symmetrically-disposed front wheels, and the sensor is near one of the two front wheels.

Furthermore, the fixed assembly includes a magnetic member, having magnetism, and the sensor includes a Hall sensor.

Furthermore, the fixed assembly includes an infrared reflection member configured to reflect infrared radiation, and the sensor includes an infrared sensor.

Furthermore, the fixed assembly includes a photoelectric reflection member, and the sensor includes a photoelectric sensor.

Furthermore, the lawn mower further includes: a handle for a user to push the lawn mower, where the handle is operably connected to the chassis.

Another lawn mower includes: a blade configured to cut grass; a chassis configured to accommodate the blade; a front wheel operably connected to a front side of the chassis; a rear wheel operably connected to a rear side of the chassis; a motor at least configured to drive the blade to rotate; a detection apparatus configured to detect a rotational speed of the front wheel; and a controller configured to enable the motor to decelerate when the rotational speed of the front wheel decreases.

Furthermore, the lawn mower further includes a fixed assembly, configured to rotate along with the front wheel, where the detection apparatus includes: a sensor configured to generate a signal when the fixed assembly passes across a predetermined position; and the sensor and the chassis are fixedly connected.

Furthermore, the sensor is disposed at a position near the front wheel.

Furthermore, the lawn mower has two-symmetrically disposed front wheels, and the sensor is near one of the two front wheels.

Furthermore, the fixed assembly includes a magnetic member, an infrared reflection member or a photoelectric reflection member, where the sensor includes a Hall sensor, an infrared sensor or a photoelectric sensor.

Another lawn mower includes: a blade configured to cut grass; a chassis configured to accommodate the blade; a roller operably connected to the chassis; a motor at least configured to drive the blade to rotate; a detection apparatus configured to detect a rotational speed of the roller; and a controller configured to enable the motor to decelerate when the rotational speed of the roller is less than a predetermined value.

A self-propelled power tool=includes: a handle configured to operate the power tool by a user; a chassis connected to the handle; a front wheel operably connected to a front side of the chassis; a rear wheel, operably connected to a rear side of the chassis; a motor at least configured to drive the rear wheel to rotate; a detection apparatus configured to detect a rotational speed of the front wheel; and a controller configured to adjust, according to the detected rotational speed of the front wheel, a current for driving the motor.

Furthermore, the power tool further includes a fixed assembly configured to roll along with the front wheel, where the detection apparatus includes a sensor, configured to generate a signal when the fixed assembly passes across a predetermined position.

Furthermore, the power tool has two symmetrically-disposed front wheels, and the sensor is near one of the two front wheels.

Furthermore, the fixed assembly includes a magnetic member, an infrared reflection member or a photoelectric reflection member.

Furthermore, the sensor includes a Hall sensor, an infrared sensor or a photoelectric sensor.

A method for controlling a self-propelled lawn mower is provided, the lawn mower including: a front wheel operably connected to a front side of a chassis; a rear wheel operably connected to a rear side of the chassis; and a motor at least configured to drive the rear wheel to rotate; and the control method including: detecting a rotational speed of the front wheel; determining whether the rotational speed of the front wheel is less than a predetermined value; and when the rotational speed of the front wheel is less than the predetermined value, reducing a drive current of the motor.

Furthermore, a duty cycle of a drive signal for driving the motor is reduced to reduce the drive current of the motor.

Another self-propelled lawn mower includes: a blade, configured to cut grass; a chassis, configured to accommodate the blade; a roller operably connected to the chassis; a motor at least configured to drive the roller; a detection apparatus at least configured to detect an attitude of the lawn mower; and a controller configured to adjust a rotational speed of the motor when the attitude of the lawn mower changes.

Furthermore, the detection apparatus includes: an inertial sensor, configured to generate a signal when the attitude of the lawn mower changes, where the inertial sensor and the chassis are fixedly connected.

Furthermore, the inertial sensor includes one or a combination of an acceleration sensor and a gyroscope.

Furthermore, the lawn mower further includes: a handle for a user to push the lawn mower, where the handle is connected to the chassis.

Another self-propelled power tool includes: a handle for a user to push the power tool; a chassis connected to the handle; a roller operably connected to the chassis; a motor, at least configured to drive the roller; a detection apparatus at least configured to detect an attitude of a power tool; a controller configured to adjust a rotational speed of the motor when the attitude of the power tool changes.

Furthermore, the detection apparatus includes: an inertial sensor, fixedly connected to the chassis.

Furthermore, the inertial sensor includes one or a combination of an acceleration sensor and a gyroscope.

The foregoing power tool is a snow blower or a lawn mower.

A method for controlling a self-propelled lawn mower is provided, the lawn mower including a blade configured to cut grass; a chassis configured to accommodate the blade; a roller operably connected to the chassis; a motor, configured to drive the roller; and the control method including: detecting an attitude of the lawn mower; and adjusting a drive current of the motor when the attitude of the lawn mower changes.

Furthermore, the drive current of the motor is adjusted to adjust a rotational speed of the motor.

A self-propelled lawn mower includes: a body; a blade configured to cut grass; a chassis configured to accommodate the blade; a front wheel operably connected to a front side of the chassis; a rear wheel operably connected to a rear side of the chassis; a rear-wheel motor at least configured to drive the rear wheel to rotate; a detection unit, including a plurality of detection elements, configured to detect an actual attitudinal position when the front wheel of the lawn mower is lifted to make a turn; and a controller configured to control the rear-wheel motor to decelerate or accelerate when the detected actual attitudinal position of the lawn mower deviates from a predetermined attitudinal position.

Furthermore, the detection unit detects an angular velocity in a vertical direction perpendicular to a plane in which the body of the lawn mower lies, and when the detected angular velocity of the lawn mower is greater than a predetermined value and the position of the lawn mower is higher than a zero potential surface, the controller enables the rear-wheel motor to decelerate.

A self-propelled lawn mower includes: a body; a blade configured to cut grass; a chassis configured to accommodate the blade; a front wheel operably connected to a front side of the chassis; a rear wheel operably connected to a rear side of the chassis; a rear-wheel motor at least configured to drive the rear wheel to rotate; a detection unit, including a plurality of detection elements, configured to detect an actual attitudinal position when the body is making a turn; and a controller, configured to control the rear-wheel motor to decelerate or accelerate when the detected actual attitudinal position of the body deviates from a predetermined attitudinal position.

A self-propelled lawn mower includes a body; a blade, configured to cut grass; a chassis, configured to accommodate the blade; a front wheel operably connected to a front side of the chassis; a rear wheel operably connected to a rear side of the chassis; a rear-wheel motor at least configured to drive the rear wheel to rotate; a detection unit, including a plurality of detection elements, configured to detect an actual attitudinal position when the body makes a turn; and a controller configured to control the rear-wheel motor to decelerate or accelerate when the detected actual attitudinal position of the body deviates from a predetermined attitudinal position.

A self-propelled lawn mower includes a body; a blade configured to cut grass; a chassis configured to accommodate the blade; a front wheel operably connected to a front side of the chassis; a rear wheel operably connected to a rear side of the chassis; a rear-wheel motor at least configured to drive the rear wheel to rotate; a detection unit, including one or more detection elements, configured to detect an actual attitudinal position of the body; and a controller configured to control the rear-wheel motor to decelerate or accelerate when the detected actual attitudinal position of the body deviates from a predetermined attitudinal position.

A lawn mower includes a body; a blade configured to cut grass; a chassis configured to accommodate the blade; a front wheel operably connected to a front side of the chassis; a rear wheel operably connected to a rear side of the chassis; a rear-wheel motor at least configured to drive the rear wheel to rotate; a detection unit, including a plurality of detection elements, configured to detect a plurality of axial positions including at least a first axial position and a second axial position, to obtain an actual attitudinal position of the body; and a controller, configured to control the rear-wheel motor to decelerate or accelerate when the detected actual attitudinal position of the body deviates from a predetermined attitudinal position.

A lawn mower includes a body; a blade configured to cut grass; a chassis configured to accommodate the blade; a front wheel operably connected to a front side of the chassis; a rear wheel operably connected to a rear side of the chassis;

a rear-wheel motor at least configured to drive the rear wheel to rotate; a detection unit, including a plurality of detection elements, configured to detect a plurality of axial position measurements of the body at least including a first axial position measurement and a second axial position measurement, to obtain an actual attitudinal position of the body; and a control and processing unit configured to control the rear-wheel motor to decelerate or accelerate when the detected actual attitudinal position of the body deviates from a predetermined attitudinal position.

A lawn mower includes a body; a blade configured to cut grass; a chassis configured to accommodate the blade; a front wheel operably connected to a front side of the chassis; a rear wheel operably connected to a rear side of the chassis; a rear-wheel motor at least configured to drive the rear wheel to rotate; a detection unit, including a plurality of detection elements; and a control and processing unit configured to: enable the a plurality of detection elements to detect an actual attitudinal position of the body when the body moves to a position that presents an attitude; and control the rear-wheel motor to decelerate or accelerate when the detected actual attitudinal position of the body deviates from a predetermined attitudinal position.

Furthermore, the control and processing unit includes a processing unit configured to process data obtained by the detection elements through detection to obtain the actual attitudinal position of the body.

The beneficial effects of the present invention lie in that a speed of a front wheel is detected to control a moving speed of a lawn mower, thereby enhancing the performance of the lawn mower.

DETAILED DESCRIPTION

The present invention is specifically described below with reference to the accompanying drawings and specific examples.

Figure 1:
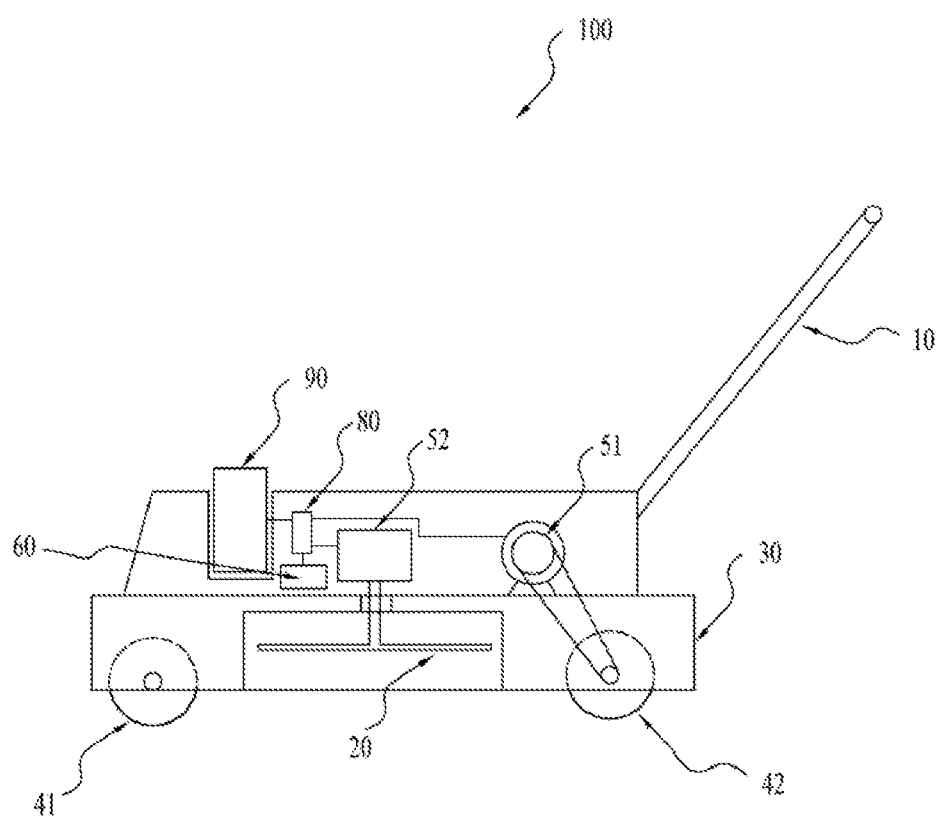
FIG. 1 is a structural perspective view of a lawn mower according to an example of the present invention.
Figure 2:
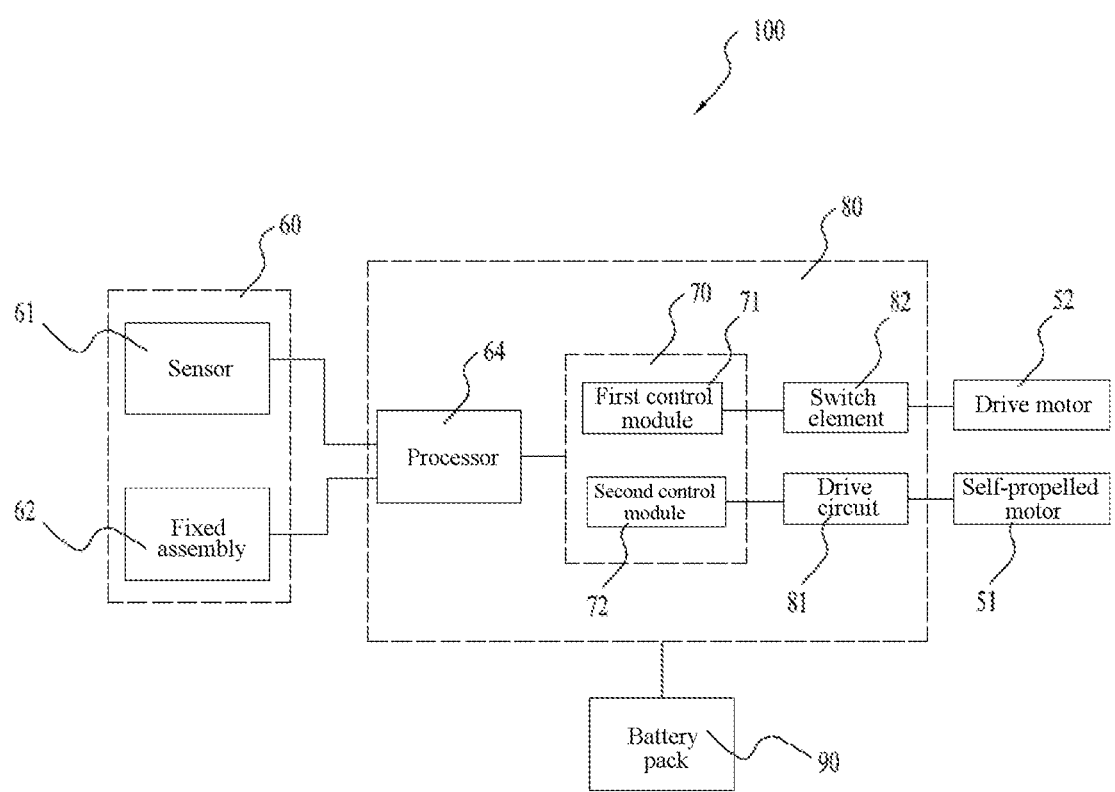
FIG. 2 is a system block diagram of the lawn mower shown in FIG. 1.

Referring to FIG. 1 and FIG. 2, a lawn mower 100 includes: a handle 10 for a user to operate the lawn mower, a blade 20 configured to cut grass, a chassis 30 configured to accommodate the blade, a front wheel 41 operably connected to a front side of the chassis, and a rear wheel 42 operably connected to a rear side of the chassis.

The lawn mower 100 further includes a battery pack 90, a circuit board 80, a self-propelled motor 51, a drive motor 52, a detection apparatus 60, and a controller 70. The battery pack 90 is used as a power supply for the lawn mower to work. The battery pack 90 is electrically connected to the circuit board 80 and is configured to supply power to the lawn mower. The circuit board 80 is electrically connected to the detection apparatus 60, the self-propelled motor 51, and the drive motor 52, respectively. The detection apparatus 60 is configured to detect a rotational speed of the front wheel 41. The controller 70 is disposed on the circuit board 80 and configured to control the drive motor 52 and/or the self-propelled motor 51. An output shaft of the drive motor 52 is connected to the blade 20 to drive the blade to work. The self-propelled motor 51 is in transmission connection with the rear wheel 42. The self-propelled motor rotates to drive the rear wheel to move. Specifically, the controller 70 includes a first control module 71 and a second control module 72. The first control module 71 is configured to control the rotation of the drive motor 52. The second control module 72 is set to output a signal for reducing a rotational speed of the drive motor 52 when the detection apparatus 60 detects that the rotational speed of the front wheel decreases, so as to enable or control the self-propelled motor 51 to decelerate. The controller may alternatively be wirelessly connected to the detection apparatus. The first control module and the second control module may alternatively be respectively disposed within two chips.

Figure 3:
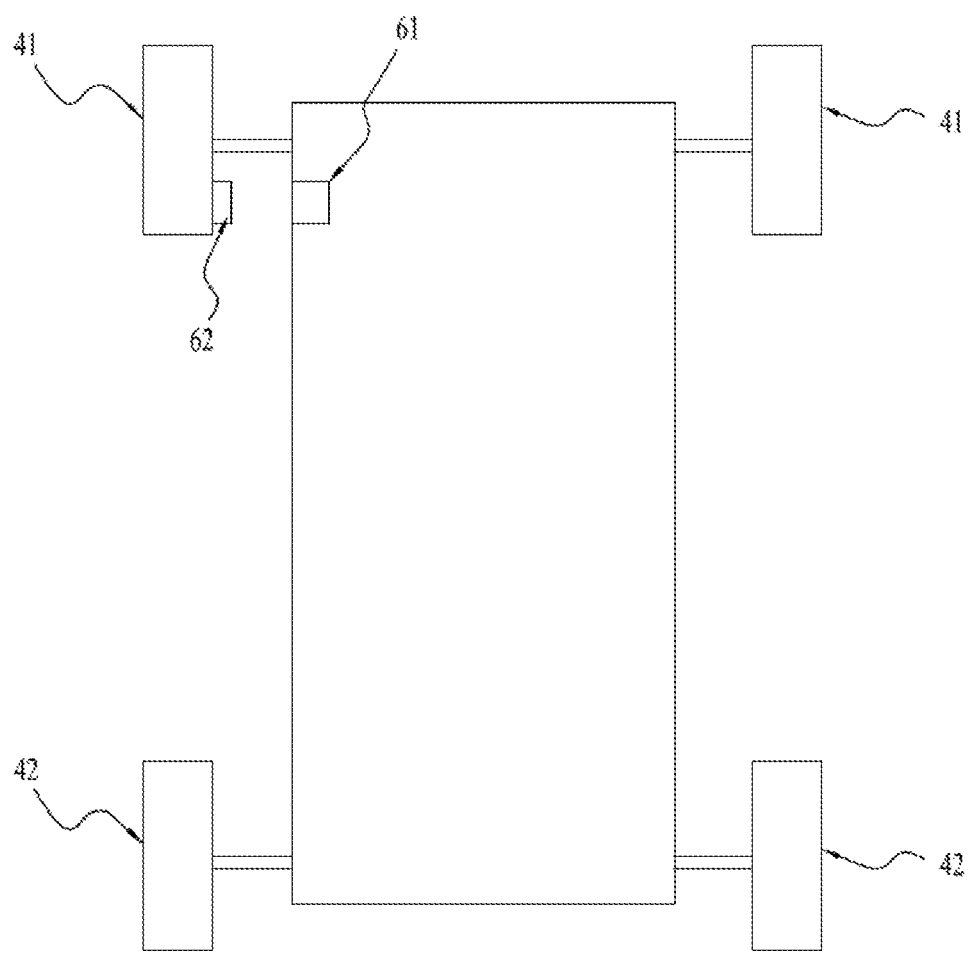
FIG. 3 is a schematic diagram of a mounting position of a detection apparatus in the lawn mower shown in FIG. 1.
Figure 4:
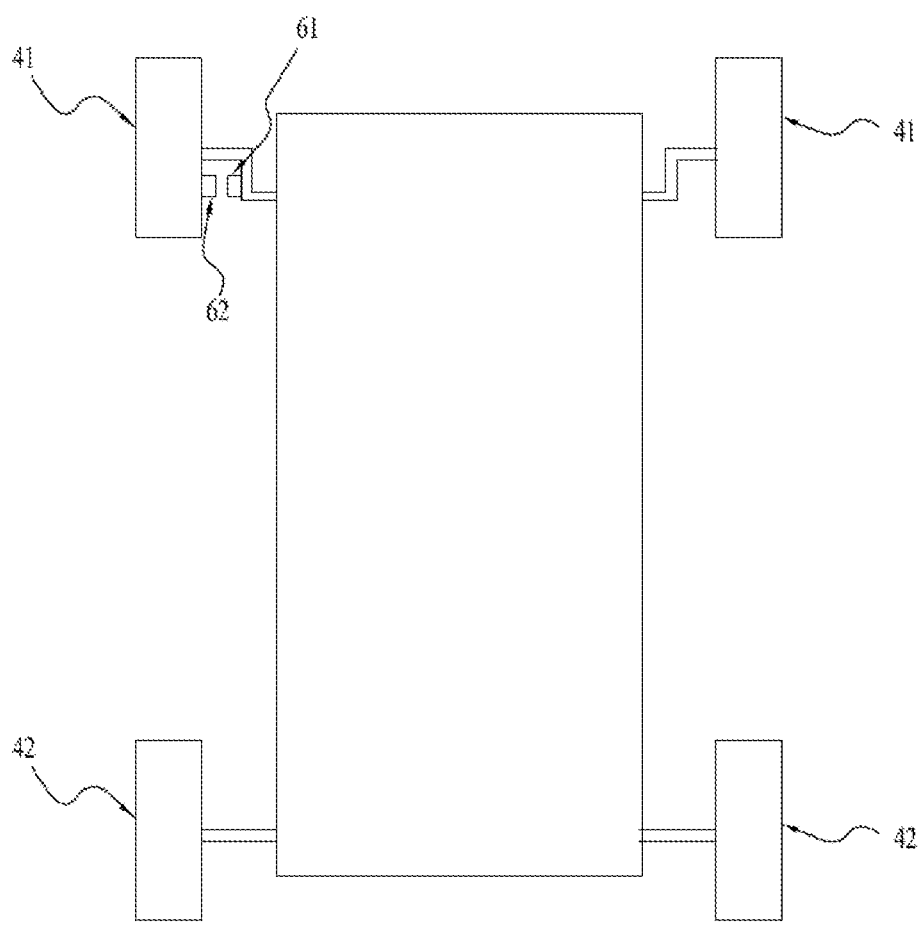
FIG. 4 is a schematic diagram of another mounting position of the detection apparatus in the lawn mower shown in FIG. 1.

Referring to FIG. 3, the lawn mower 100 has two symmetrically-disposed front wheels 41 and two symmetrically-disposed rear wheels 42 with respect to a central line of respective front wheel and rear wheel axes. The front and rear discussed herein are relative to the position of the handle 10, where the position near the side of the handle is referred to rear, whereas the position that is far away from the side of the handle is referred to front. The two symmetrically-disposed front wheels are connected by a connecting shaft connected to the chassis. The detection apparatus 60 includes one or more detection elements. The plurality of detection elements may be combined to perform multi-dimensional detection. In an example of the present invention, the detection apparatus 60 includes a sensor 61 and a fixed assembly 62. The fixed assembly 62 is mounted on the front wheels 41 and rotates along with the front wheels. The sensor 61 is fixedly connected to the chassis 30. The sensor 61 is configured to generate a signal when the fixed assembly 62 passes across a predetermined position. The predetermined position herein may be a sensing area in which the sensor 61 can sense the passage of the fixed assembly 62. The fixed assembly 62 rotates along with the front wheels, and the sensor 61 generates one signal each time the fixed assembly 62 passes across the predetermined position. The rotational speed of the front wheels can be obtained by recording a quantity of signals generated by the sensor within a particular time. Specifically, the sensor 61 is disposed at a position, near the front wheels 41, on the front side of the chassis, so that the sensor 61 can sense whether the fixed assembly 62 passes across a predetermined area. Certainly, referring to FIG. 4, the sensor 61 may alternatively be disposed on the connecting shaft connected to the front wheels, and is near the front wheels on which the fixed assembly 62 is disposed. It should be noted that the positions of the sensor 61 and the fixed assembly 62 are not limited thereto, provided that the sensor can generate a signal when the fixed assembly passes by the sensor so as to measure the speed of the front wheels.

Furthermore, the sensor 61 includes a Hall sensor. The fixed assembly 62 includes a magnetic member. In an example, the Hall sensor 63 is fixedly connected to the chassis 30. The magnetic member is mounted on the front wheel 41. The front wheel rotates to drive the magnetic member to rotate to generate a changing magnetic field. The Hall sensor detects the rotational speed of the front wheel in real time according to the changing magnetic field. A quantity of the magnetic members may be increased according to a specific response requirement of the lawn mower. The sensor 61 may alternatively be an infrared sensor. In this case, the fixed assembly 62 is an infrared sensor that can reflect infrared radiation. When the sensor 61 is a photoelectric sensor, the fixed assembly 62 is a photoelectric reflection member that can reflect light. Certainly, the sensor 61 and the fixed assembly 62 may alternatively include a combination of the foregoing sensors and fixed assemblies. The sensor 61 may alternatively be a pressure sensor, and the fixed assembly 62 is a pressure sensing probe. The change of the pressure of the front wheel is detected to control a rotational speed of the self-propelled motor.

Referring to FIG. 2, the lawn mower 100 further includes a processor 64. The processor 64 receives a signal that is collected from the sensor 61 and is in relation to the rotational speed of the front wheel 41. The signal is processed by the processor 64 and is converted into a rotational speed signal of the front wheel, and the rotational speed signal is input to the second control module 72. When the rotational speed of the front wheel decreases, the second control module 72 outputs a control instruction for reducing the rotational speed of the self-propelled motor 51. When the lawn mower 100 moves autonomously, the second control module 72 controls the self-propelled motor 51 to work. The self-propelled motor 51 drives the rear wheel 42 to rotate to push the lawn mower 100 to move. When the lawn mower 100 makes a turn, a user presses the handle to lift the front wheel of the lawn mower. The front wheel is no longer subject to a pushing force, thus enabling the speed of the front wheel to decrease. The second control module outputs the control instruction for reducing the rotational speed of the self-propelled motor when the speed of the front wheel decreases, enabling the rotational speed of the motor to decrease, so as to reduce a moving speed of the rear wheel driven by the self-propelled motor. In this way, the defect that a self-propelled speed of the lawn mower is excessively high to pull the user to gallop can be overcome, and a desirable experience of the user is achieved.

In another example, the lawn mower 100 moves at a predetermined self-propelled speed. The detection apparatus detects the rotational speed of the front wheel in real time. The second control module 72 may adjust the rotational speed of the self-propelled motor in real time in a stepwise manner according to the speed of the front wheel. For example, when the sensor detects that the rotational speed of the front wheel decreases to a first rotational speed, the second control module 72 controls the rotational speed of the self-propelled motor to decrease to a first speed. When the sensor detects that the rotational speed of the front wheel decreases to a second rotational speed, the second control module 72 controls the rotational speed of the self-propelled motor to decrease to a second speed. When the sensor detects that the rotational speed of the front wheel decreases to a third rotational speed, the second control module 72 controls the rotational speed of the self-propelled motor to decrease to a third speed or zero. The third rotational speed is lower than the second rotational speed. The second rotational speed is lower than the first rotational speed. The third speed is lower than the second speed. The second speed is lower than the first speed. Certainly, when the rear wheel of the lawn mower pushes the front wheel to move and operate on the ground, the speed of the front wheel gradually increases. When the detection apparatus detects that the rotational speed of the front wheel is the third rotational speed, the second control module 72 controls the rotational speed of the self-propelled motor to increase to the third speed. When the rotational speed of the front wheel is the second rotational speed, the second control module 72 controls the rotational speed of the self-propelled motor to increase to the second speed. A similar process is performed until the lawn mower 100 moves at a predetermined self-propelled speed again. The second control module may adaptively adjust the rotational speed of the self-propelled motor according to the rotational speed of the front wheel detected by the detection apparatus in real time, so that the inconvenience of mechanical adjustment is avoided, and the life of the self-propelled motor and the performance of the lawn mower are thus improved. In addition, the second controller 72 may proportionally change a voltage or a current applied to the self-propelled motor 5151.

Furthermore, the lawn mower 100 further includes a drive circuit 81. The drive circuit 81 is serially connected between the second control module 72 and the self-propelled motor 51. The second control module 72 adjusts a duty cycle of a drive signal of the drive circuit to change a current applied to the self-propelled motor 51. Specifically, the detection apparatus detects the rotational speed of the front wheel. When the second control module determines that the rotational speed of the front wheel is less than a predetermined value of the second control module, the second control module 72 outputs a control instruction for reducing the duty cycle of the drive circuit to reduce the current or voltage of the self-propelled motor. The second controller 72 may be adapted to output, according to the rotational speed signal of the front wheel input by the detection apparatus, the voltage or current applied to the self-propelled motor 51, so as to ensure that the current output by the self-propelled motor matches the rotational speed of the front wheel to protect the self-propelled motor. Specifically, the second control module 72 may obtain an acceleration of the front wheel according to the rotational speed of the front wheel input in real time by the detection apparatus. The acceleration will suddenly change when the front wheel is lifted. In this case, the second control module 72 is triggered to output the control instruction. Optionally, the second control module 72 may alternatively increase in a stepwise manner, according to the rotational speed of the front wheel input in real time by the detection apparatus, the duty cycle of the drive signal that drives the self-propelled motor. An input signal and an output signal of the second control module 72 may be adjusted by using PID.

Furthermore, after the second control module 72 outputs the control instruction for reducing the rotational speed of the self-propelled motor, the first control module 71 enables the drive motor 52 to decelerate. Specifically, a switch element 82 is serially connected between the first control module 71 and the drive motor 52. The switch element 82 may form a switch circuit to drive, under the control of the first control module 71, the drive motor 52 to rotate. The switch element 82 includes a field effect transistor. When the lawn mower makes a turn and the front wheel is lifted, at least a part of the blade leaves the ground. As the rotational speed of the drive motor is reduced at the same time when a moving speed of the lawn mower is reduced, electrical energy can be saved. Apparently, the switch element 82 may alternatively be a mechanical switch. A user manually operates the mechanical switch to control the drive motor to work or stop.

Figure 5:
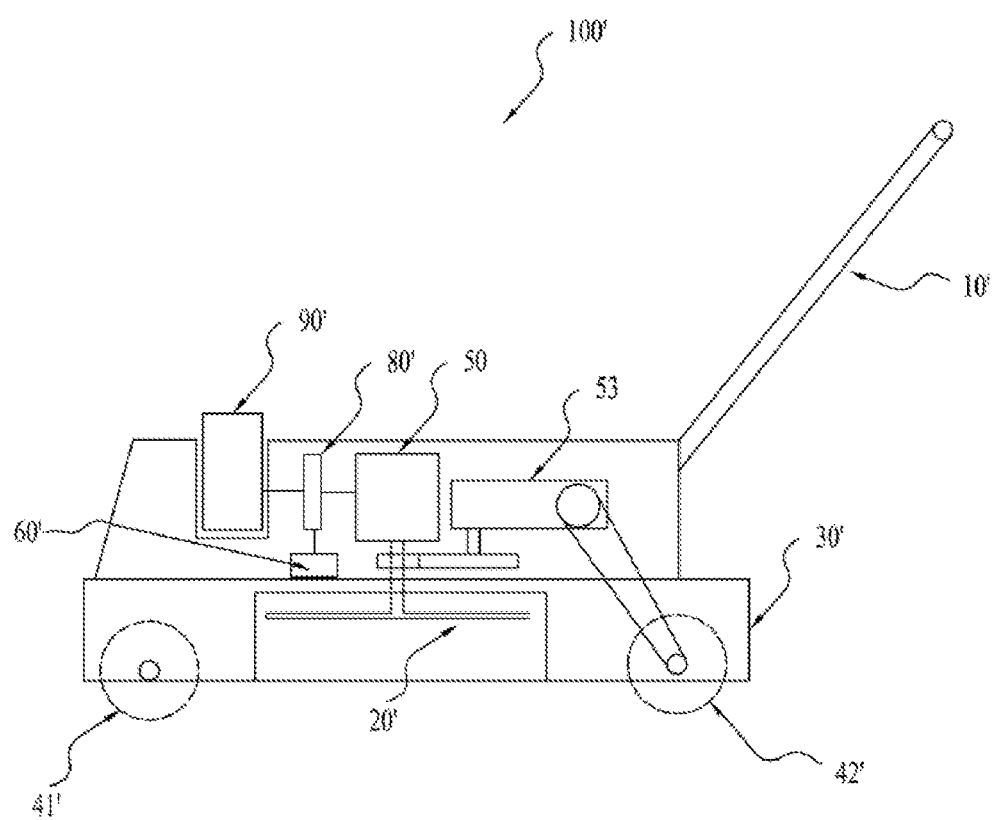
FIG. 5 is a structural perspective view of a lawn mower according to another example of the present invention.

Referring to FIG. 5, FIG. 5 is a structural perspective view of the inside of a lawn mower 100' according to another example. The lawn mower 100' includes: a handle 10' used by a user to operate the lawn mower, a blade 20' configured to cut grass, a chassis 30' configured to accommodate the blade, a front wheel 41' operably connected to a front side of the chassis, a rear wheel 42' operably connected to a rear side of the chassis, and a detection apparatus 60'. A difference from the foregoing examples lies in that the lawn mower 100' includes a motor 50. The motor 50 is connected to the blade to drive the blade to rotate. The motor 50 is connected to a gearbox 53. The gearbox 53 is in transmission connection with the rear wheel 42'. The motor 50 drives the gearbox to rotate to drive the rear wheel 42' to move. That is, the motor 50 in the lawn mower 100' can both drive the blade 20' to rotate and drive self-propelling of the rear wheel 42'. A controller 70' controls the working of the motor 50 according to a rotational speed of the front wheel detected by the detection apparatus 60', so as to control a moving speed of the rear wheel. The basic working principles and control implementations of the lawn mower 100' are generally the same as those of the foregoing lawn mower 100. Details are not described herein again.

It should be noted that a power tool such as a snow blower that has a self-propelled function also falls within the protection scope of the present invention.

A method for controlling the lawn mower in the foregoing implementation is provided, including: detecting a rotational speed of a front wheel; determining whether the rotational speed of the front wheel is less than a predetermined value; and when the rotational speed of the front wheel is less than the predetermined value, reducing a rotational speed of a motor. Specifically, a drive current of a drive motor is reduced to reduce the rotational speed of the drive motor to a particular value. Further specifically, a duty cycle of a drive signal of the drive motor is reduced to reduce the drive current of the motor.

Figure 6:
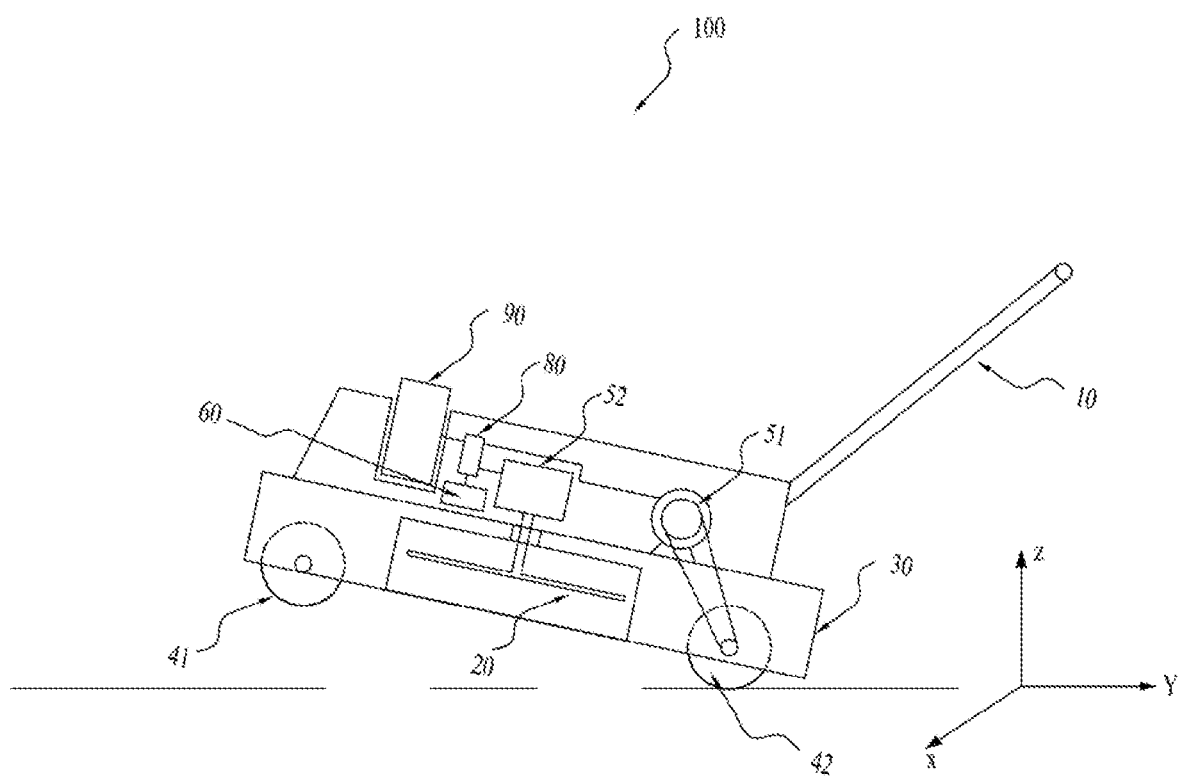
FIG. 6 is a schematic structural diagram when a front wheel of a lawn mower is lifted.

Referring to FIG. 6, when the lawn mower 100 makes a turn, a user presses the handle to lift the front wheel of the lawn mower. In this case, the attitude of the lawn mower 100 changes, and the lawn mower 100 is at a particular tilt from the ground. It is defined that a horizontal plane in which the ground lies is an X-Y plane. A Z axis is perpendicular to the X-Y plane. Apparently, the X-Y plane is a zero potential surface. The detection apparatus 60 can detect the attitude of the lawn mower 100.

Figure 7:
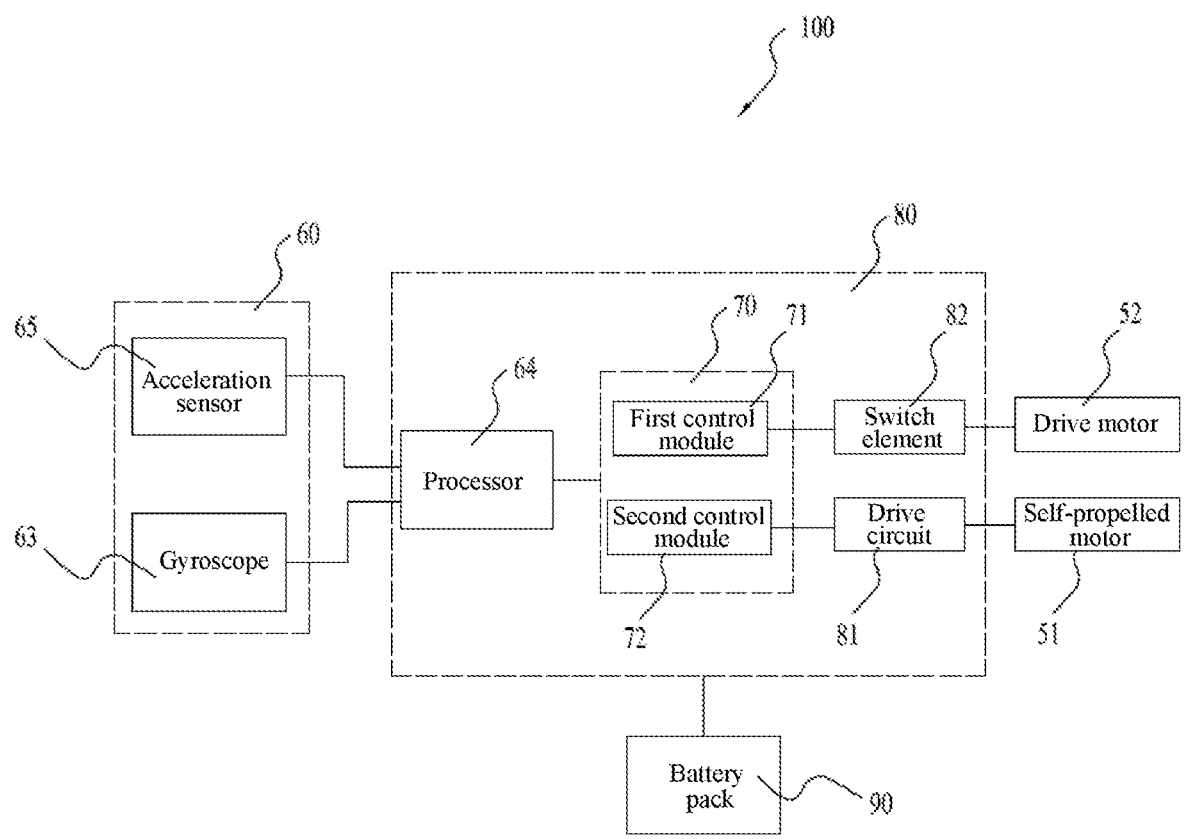
FIG. 7 is a system block diagram of the lawn mower shown in FIG. 6.

FIG. 7 is a system schematic block diagram of the lawn mower 100, including a battery pack 90, a detection apparatus 60, a processor 64, a controller 70, a drive circuit 81, a self-propelled motor 51, and a drive motor 52. The battery pack is configured to supply power to the lawn mower. The controller 70 and the drive circuit 81 may both be integrated on the circuit board 80.

In a specific solution, the detection apparatus 60 includes an inertial sensor. The inertial sensor may be disposed at any position on the chassis 30 and is fixedly connected to the chassis. The inertial sensor is electrically connected to the controller. The controller 70 receives a signal that is input from the inertial sensor and is about an attitude of the lawn mower. The controller 70 adjusts a rotational speed of the self-propelled motor 51 according to a change of the attitude of the lawn mower when the attitude of the lawn mower changes. When the lawn mower makes a turn, the user presses the handle to lift the front wheel of the lawn mower. When the position of the lawn mower changes, the controller 70 reduces the rotational speed of the self-propelled motor according to the change of the position of the lawn mower detected by the inertial sensor 61, to enable the speed of the lawn mower to decrease, so that the lawn mower can adaptively help the user to push the lawn mower to make turns or move. It should be noted that the electrical connection between the detection apparatus and the controller may include a wired electrical connection manner and a wireless electrical connection manner.

The inertial sensor is a gyroscope 63. The gyroscope is mounted on the chassis 30. The gyroscope and the chassis are kept level with each other. When the lawn mower moves forward horizontally, an angle signal in a vertical direction of the lawn mower detected by the gyroscope is zero. That is, the lawn mower is located at a zero potential surface. The attitude of the lawn mower changes when the front wheel of the lawn mower is lifted. The angle signal in the vertical direction of the lawn mower detected by the gyroscope is not zero, and the position of the lawn mower is higher than the zero potential surface. Possibly, the gyroscope may be disposed at a position, near the front wheel, on the chassis, so that the gyroscope can rapidly detect the change of the angle of the lawn mower. The gyroscope is in communication connection with the controller 70. When the angle of the lawn mower detected by the gyroscope changes and the position of the lawn mower is higher than the zero potential surface, the controller 70 reduces the rotational speed of the motor to reduce a rotational speed of a rear wheel, so as to reduce the speed of the lawn mower.

In another example of the present invention, the front wheel of the lawn mower is lifted. The detection apparatus 60 detects an angular velocity in a vertical direction Z' perpendicular to a plane in which the body of the lawn mower lies. When the detected angular velocity of the lawn mower is greater than a predetermined value and the position of the lawn mower is higher than a zero potential surface, the controller 70 enables the rotational speed of the motor to decelerate to reduce the rotational speed of the rear wheel, so as to reduce the speed of the lawn mower.

The lawn mower 100 further includes a processor 64. The inertial sensor may be an acceleration sensor 65. The acceleration sensor 65 is mounted at any position on the chassis 30 and is kept level with the chassis 30. The acceleration sensor 65 may measure accelerations in an X axis, a Y axis, and a Z axis of the lawn mower. The processor 64 is mounted on the chassis and is connected to the acceleration sensor 65. The processor 64 performs processing of inverse trigonometric functions and filtering processing on data about the accelerations in the X axis, the Y axis, and the Z axis of the lawn mower that are detected by the acceleration sensor 65 to obtain data about an attitude of the lawn mower. The controller 70 is electrically connected to the processor 64. The controller 70 reduces the rotational speed of the motor according to the received data that is obtained through processing by the processor 64 and is about the attitude of the lawn mower. The inertial sensor may alternatively be a combination of the acceleration sensor 65 and the gyroscope 63. The acceleration sensor 65 and the gyroscope 63 are both disposed on the chassis 30. Specifically, the acceleration sensor 65 and the gyroscope 63 are disposed in parallel at an interval on the chassis 30 in an X axis direction or in parallel at an interval on the chassis in a Y axis direction. Only examples of possible positions of the acceleration sensor and the gyroscope are shown here, and the present invention is not limited thereto.

The controller 70 in this example includes a first control module 71 configured to control the drive motor 52 and a second control module 72 configured to control the self-propelled motor 51. The first control module 71 is electrically connected to the second control module 72. Optionally, when the second control module outputs a control instruction for reducing the rotational speed of the self-propelled motor 51, the first control module outputs a control instruction for reducing the rotational speed of the drive motor 52 to save electrical energy of the battery pack. Certainly, two different controllers may also be configured to respectively control the drive motor 52 and the self-propelled motor 51. The two controllers may both be integrated on the same circuit board. The lawn mower 100 further includes a drive circuit 80 configured to drive the motor to work. The drive circuit 80 is electrically connected to the second control module 72 and the self-propelled motor 51. The second control module 72 controls a drive signal of the drive circuit 80 to drive the self-propelled motor to work. Specifically, the foregoing detection apparatus 60 detects a change of the attitude of the lawn mower. The second control module 72 outputs, according to a detected grass cutting attitude change, a control signal for reducing a duty cycle of the drive signal of the drive circuit 80. The rotational speed of the self-propelled motor is reduced in a manner of reducing the duty cycle of the drive signal of the drive circuit 80. For example, when the lawn mower 100 makes a turn, a user presses the handle to lift the front wheel of the lawn mower. When the gyroscope detects that the angle signal in the vertical direction of the lawn mower is not zero, the second control module 72 responds to the input of the gyroscope to output a control instruction for reducing the duty cycle of the drive signal of the drive circuit 80, to enable the rotational speed of the self-propelled motor to decrease. When the lawn mower finishes making a turn, the front wheel is put down, and the lawn mower continues to move to cut grass. When the gyroscope detects that the angle signal in the vertical direction of the lawn mower is zero, the second control module 72 responds to an input signal of the gyroscope to output an control instruction for increasing the duty cycle of the drive signal of the drive circuit 80, so as to enable the rotational speed of the self-propelled motor to increase until a predetermined self-propelled speed of the lawn mower is restored. Certainly, the second control module 72 may alternatively adjust the rotational speed of the motor in a manner of adjusting a drive current or a drive voltage of the motor. Certainly, the switch element 82 may alternatively be serially connected between the first control module 71 and the drive motor 52 to control the work of the drive motor. The switch element 82 may be an electronic switch or a mechanical switch. The electronic switch is a field effect transistor. Alternatively, the electronic switch element may be integrated on the drive circuit.

In some examples of the present invention, the lawn mower includes a body. The detection apparatus 60 may be a detection unit. The detection unit includes a plurality of detection elements configured to detect an actual attitudinal position of the body, and control the rear-wheel motor to decelerate or accelerate when the obtained actual attitudinal position of the body deviates from a predetermined attitudinal position.

In an example of the present invention, the plurality of detection elements are configured to detect plurality of axial positions of the body that include at least a first axial position and a second axial position, where the first axial position is different from the second axial position, so as to obtain an actual attitudinal position of the body. Certainly, the detection unit may alternatively detect the plurality of axial position measurements of the body. The position measurement is a measurement about passing a position, and is, for example, a speed, an angular acceleration or an angular velocity. The present invention is not limited thereto.

In some other examples of the present invention, the lawn mower includes a control and processing unit, configured to: enable the plurality of detection elements to detect an actual attitudinal position of the body when the body moves to a position to present an attitude; and enable the rear-wheel motor to decelerate or accelerate when the obtained actual attitudinal position of the body deviates from a predetermined attitudinal position. It should be noted herein that an object that can be detected by these detection elements is the front wheel, the chassis, or any position on the body. The plurality of detection elements perform detection together, and the control and processing unit performs processing to obtain the actual attitudinal position of the body, so as to control the rear-wheel motor to decelerate or accelerate.

It should be noted that the present invention is not necessarily a lawn mower having a self-propelling function, and may alternatively be some other lawn mowers. No limitation is constituted herein. The foregoing shows and describes the basic principles, major features and advantages of the present invention. A person skilled in the art should understand that the present invention is not limited in any form in the foregoing examples. Any technical solution obtained by using equivalent replacements or equivalent conversions shall fall within the protection scope of the present invention.

What is claimed is:

1. A self-propelled lawn mower, comprising:
a blade configured to cut grass;
a chassis configured to accommodate the blade;
a front wheel connected to a front side of the chassis;
a rear wheel connected to a rear side of the chassis;
a motor at least configured to drive the rear wheel to rotate;
a detection apparatus configured to detect a rotational speed of the front wheel; and
a controller configured to control the motor to decelerate when the rotational speed of the front wheel decreases, wherein
the motor is operably connected to the rear wheel, and the detection apparatus is electrically connected to the controller.

2. The lawn mower according to claim 1,
further comprising:
a fixed assembly configured to rotate along with the front wheel, wherein
the detection apparatus comprises:
a sensor configured to generate a signal when the fixed assembly passes across a predetermined position; and
the sensor is fixedly connected to the chassis.

3. The lawn mower according to claim 1, wherein the sensor is disposed at a position near the front wheel.

4. The lawn mower according to claim 2, wherein the fixed assembly comprises a magnetic member, an infrared reflection member or a photoelectric reflection member.

5. The lawn mower according to claim 2, wherein the sensor comprises a Hall sensor, an infrared sensor or a photoelectric sensor.

6. The lawn mower according to claim 1,
further comprising:
a handle for a user to push the lawn mower, wherein
the handle is operably connected to the chassis.

7. A self-propelled power tool, comprising:
a handle configured to operate the power tool;
a chassis is connected to the handle;
a front wheel operably connected to a front side of the chassis;
a rear wheel operably connected to a rear side of the chassis;

a motor at least configured to drive the rear wheel to rotate;

a detection apparatus configured to detect a rotational speed of the front wheel;

a controller configured to adjust, according to the detected rotational speed of the front wheel, a current for driving the motor, and a fixed assembly configured to roll along with the front wheel, wherein the detection apparatus comprises a sensor configured to generate a signal when the fixed assembly passes across a predetermined position.

8. A method for controlling a self-propelled lawn mower, the lawn mower comprising:

a front wheel operably connected to a front side of a chassis;

a rear wheel operably connected to a rear side of the chassis; and a motor at least configured to drive the rear wheel to rotate; and the method comprising:

detecting a rotational speed of the front wheel;

determining whether the detected rotational speed of the front wheel is less than a predetermined value; and when the rotational speed of the front wheel is less than the predetermined value, reducing a drive current of the motor.

9. The control method according to claim 8, wherein a duty cycle of a drive signal for driving the motor is reduced to reduce the drive current of the motor.

\* \* \* \* \*